Figure 1:
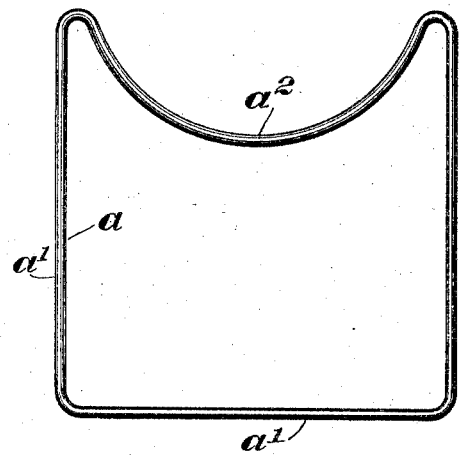

No. 767,068. PATENTED AUG. 9, 1904.
G. LANZENDORFER.
FASHIONED TEXTILE FABRIC AND PROCESS OF PRODUCING SAME.
APPLICATION FILED OCT. 12, 1903.
NO MODEL.

Witnesses:
Horace A. Crossman.
Everett S. Emery

Inventor:
George Lanzendorfer.
by Frederick L. Emery,
Atty.

No. 767,068.

Patented August 9, 1904.

UNITED STATES PATENT OFFICE.

GEORGE LANZENDORFER, OF BOSTON, MASSACHUSETTS.

FASHIONED TEXTILE FABRIC AND PROCESS OF PRODUCING SAME.

SPECIFICATION forming part of Letters Patent No. 767,068, dated August 9, 1904.

Application filed October 12, 1903. Serial No. 176,671. (No specimens.)

*To all whom it may concern:*

Be it known that I, GEORGE LANZENDORFER, a citizen of the United States, residing at Boston, in the county of Suffolk, Commonwealth of Massachusetts, have invented an Improvement in Fashioned Textile Fabric and Process of Producing the Same, of which the following description, in connection with the accompanying drawings, is a specification, like letters on the drawings representing like parts.

In the making of various articles, more particularly articles of apparel or dress, it is necessary or desirable to shape them to fit various portions of the body or various articles to be worn, and this shaping is usually done by cutting the articles of apparel according to predetermined patterns and then uniting the same by stitches. For example, in the making of dress-shields, which are required to present a pronounced concave curvature along the folded edge thereof, it is common to die out or cut the two members, giving to each a concave curvature along one edge corresponding to the desired curvature of the folded edge and then to unite the same by a line of stitches following the curved edges of the two members. In making corset linings or covers it is also common to cut out the various pieces according to the required patterns and stitch them together in order to give the necessary contraction in the vicinity of the waist.

My invention aims not only to produce a simpler and more satisfactory process for producing properly shaped or molded articles of this character, but also comprehends what I believe to be a novel article of manufacture in and of itself.

My invention comprehends the taking of a woven, knit, braided, or other fabric and arranging it about or adjacent to a suitable shape, form, or forming-surface and then subjecting the fabric to the action of a suitable shrinking agent, which will cause the fabric to shrink about or against the form or forming-surface and thereby shape it as desired without requiring the use of patterns, seams, or the like. In this way practically any desired shape, form, or fashion may be obtained and with much less labor and cost and with much less bulk than with the present methods of cutting and seaming.

To enable my invention to be better understood, I will describe the same as used in the manufacture of dress-shields, it being understood, however, that the manufacture of dress-shields is selected merely as an illustration of my invention and without limiting the invention thereto.

Figure 2:
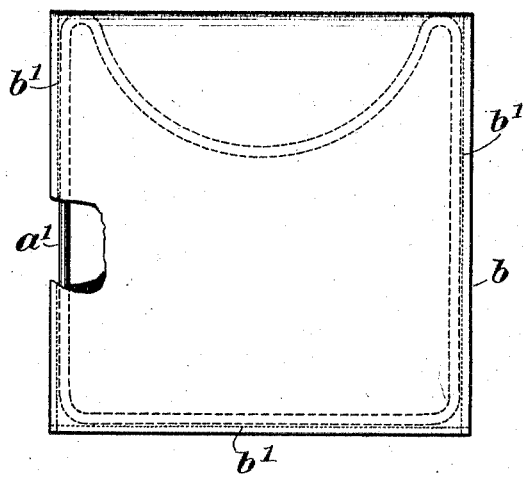
Figure 3:
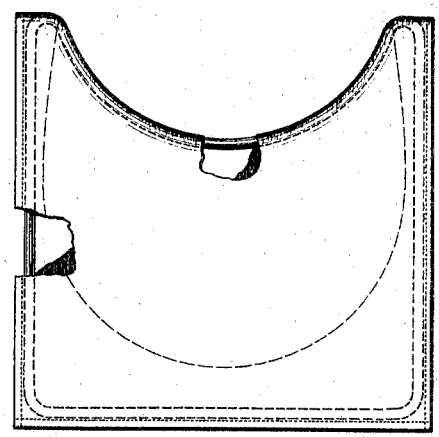
Figure 4:
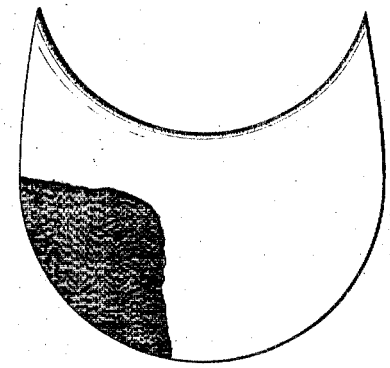

In the accompanying drawings, Figure 1 illustrates a simple and convenient form such as may be used in connection with my invention. Fig. 2 shows a piece of woven fabric arranged about a form similar to that shown in Fig. 1 preparatory to the action thereon of the shrinking agent, the fabric being broken away to expose a part of the form. Fig. 3, also partially broken away, shows the fabric after having been subjected to the action of the shrinking agent and while still upon the form; and Fig. 4 shows the fashioned article after it has been removed from the form and cut to desired exterior shape.

In the particular illustration of my invention shown in the accompanying drawings the form Fig. 1 consists of a piece of wire $a$ bent to present a convenient general exterior shape, which is preferably rectangular, with three straight sides $a'$, the wire at the fourth side, however, being given a pronounced inward or concave curvature $a^2$ corresponding to the desired curve to be imparted or given to the folded edge of the shield.

The fabric from which the shield is to be made is cut into a blank $b$ of required dimensions and shape and is arranged about the form $a$, with its folded edge extending straight across from tip to tip of the curved side $a^2$ of the form, the said fabric being then secured about the remaining three sides of the form in suitable manner, as by a line of stitches $b'$, uniting the folded-over portions of the fabric about the outside of the three straight sides $a'$ of the form. The fabric while upon the form is now subjected, preferably throughout, to the action of a suitable shrinking agent, which causes the fibers of the fabric to contract or shrink inherently as distinguished from a contraction by the aid of mechanical pressure or manipulation, such as felting, and this shrinkage can take place by drawing its folded edge inwardly toward or in contact with the curved side $a^2$ of the form, thus giving thereto the shape of the adjacent side or surface of the form.

The shrinking agent may be, for example, any of the caustic alkalies—such as soda, potash, sulfid of soda, and the like—or any suitable acid, such as sulfuric, and if the fabric is composed mainly of wool then steam may be used. The foregoing serve merely to illustrate what may be used as the shrinking agent, my invention being in no wise restricted to the particular agent employed. My invention comprehends any agent or agents which when used singly or simultaneously will cause the necessary shrinkage of the fabric to adapt it to the adjacent fashioning-surface of the form and there leaving it set, so that it will retain its new shape upon removal from the form. A convenient method of subjecting them to the action of the shrinking agent is to immerse them in a bath of the shrinking agent. The well-known mercerizing process is well adapted for this purpose, the mercerizing agent commonly being caustic soda, in which the fabric-covered form may be immersed and then immediately washed, which has the effect of setting the fabric in its new form even before it is dried.

An article when shrunk as above described differs from any article for the purpose heretofore known to me in that it is integral throughout, being structural precisely as when woven, knit, or otherwise initially produced, yet is changed in form. For example, in the making of dress-shields the threads which run laterally of the fabric piece—that is, lengthwise of the curve—whether the warp or the weft are depressed or curved, starting with curvatures that correspond or coincide with that of the adjacent surface of the form and gradually working toward and finally to their original straight lines along which they were originally laid. This change in the form of the fabric or laying of the threads has never, so far as known to me, been accomplished prior to my invention.

It is evident that various forms may be used, according to the different shapes or "fashionings" which it is desired to impart to the fabric articles, and these forms may be skeleton, such as illustrated in Fig. 1, or they may be fully rounded, solid, or more or less open, according to the requirements of each particular case.

After having been removed from the form the fashioned member may be died out or cut to any exterior shape—as, for instance, in Fig. 4, where the characteristic shape of the dress-shield of commerce has been given to the public, by dying, cutting, or otherwise.

The fashioned blank or member made in accordance with my invention may be offered for sale as an article of manufacture to be purchased by the public and cut individually to any desired shape, according to the particular preference of the purchaser.

My invention is not limited to the illustrations here shown and described, but may be widely varied within the spirit and scope of the invention.

I claim—

1. As a new article of manufacture, a fabric member fashioned by inherent shrinkage.

2. As a new article of manufacture a fabric member fashioned by a mercerizing agent.

3. The described process for fashioning fabric which consists in inherently shrinking the same against a form.

4. The described process for fashioning the fabric which consists in arranging it about a form a part only whereof presents a fashioning-surface, and subjecting the fabric throughout to an inherent shrinking action to fashion that part only which is adjacent said fashioning-surface.

In testimony whereof I have signed my name to this specification in the presence of two subscribing witnesses.

GEORGE LANZENDORFER.

Witnesses:
EVERETT S. EMERY,
ANNIE E. CHESLEY.